A. KUEFER.
POWER TRANSMISSION.
APPLICATION FILED JAN. 22, 1916.
1,241,740.
Patented Oct. 2, 1917.
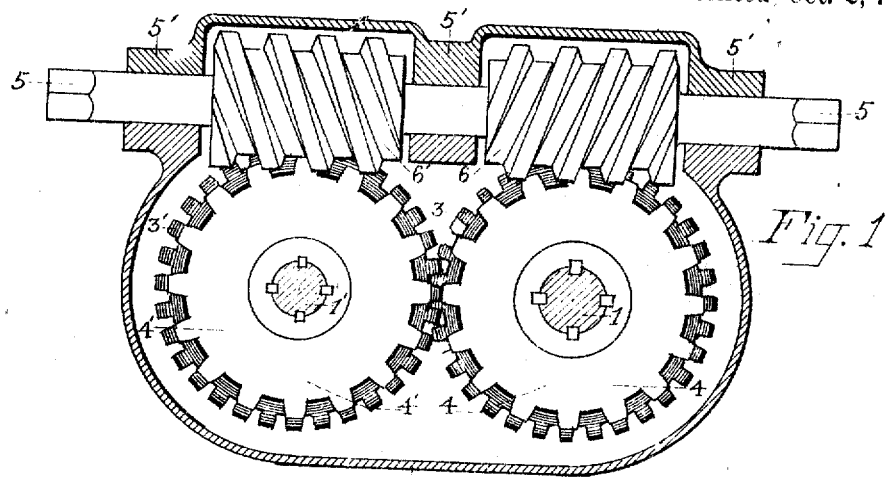
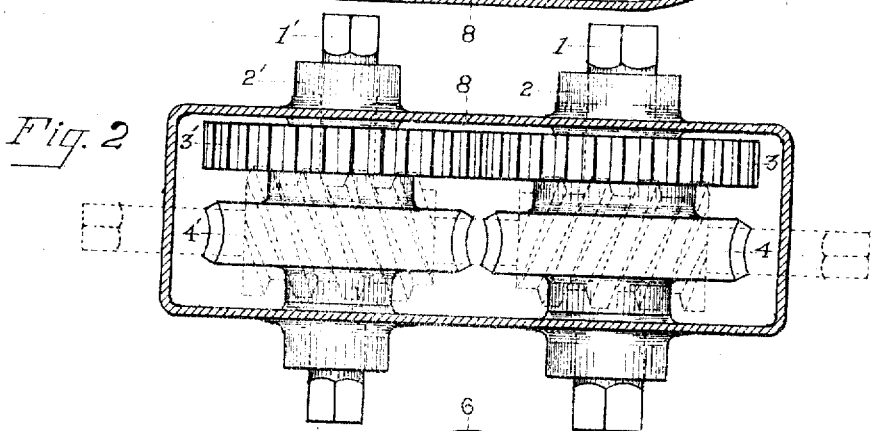
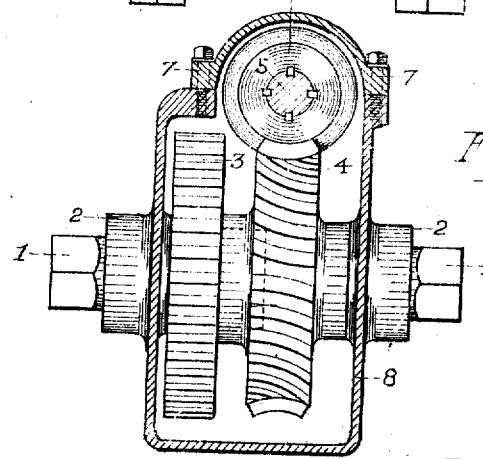
Witnesses
Fred A. Riehm
Blanche O'Brien
Inventor
Anthony Kuefer
By Richard D. Watson
His Atty.

UNITED STATES PATENT OFFICE.

ANTHONY KUEFER, OF TOLEDO, OHIO, ASSIGNOR TO ROBERT B. WILSON, TRUSTEE, OF TOLEDO, OHIO.

POWER TRANSMISSION.

1,241,740.    Specification of Letters Patent.    Patented Oct. 2, 1917.

Application filed January 22, 1916. Serial No. 73,576.

*To all whom it may concern:*

Be it known that I, ANTHONY KUEFER, a citizen of the United States, residing at Toledo, in the county of Lucas and State of Ohio, have invented new and useful Improvements in Power Transmission, of which the following is a specification.

My invention relates to power transmission and has for its object to produce in the form of a simple single unit a self contained structure comprising a casing having therein a balanced double worm drive in which end thrust is eliminated with the friction and wear incident thereto, this unit being economically utilized as a drive for mechanisms for various purposes, the power being applied to the protruding end of the worm shaft and transmitted to each of two driven shafts revolving in opposite directions at equal speed, the rotary motion being applied by either in opposite directions. The construction is such that the transmission is complete in itself and requires only to be connected up with the power on the one hand and the parts to be driven on the other hand.

In the drawing—

Figure 1 is an elevation of the device with the casing in section showing the operating parts.

Fig. 2 is a plan view of the same with the casing in section, and

Fig. 3 is an end view of the same with the casing in section.

The device comprises a casing or housing 8 and its side walls support parallel shafts 1, 1' suitably journaled in bearings 2, these shafts carrying intermeshing spur gears 3, 3' rigidly fixed upon the said shafts. The shafts also carry worm wheels 4, 4', one of right hand and the other of left hand, which are suitably spaced and rigidly fixed each to its respective shaft. Extending at right angles to the shafts 1 and 1' is a worm shaft 5 spaced and journaled in bearings 5', the bearings being arranged at the end and center of the casing. The worm shaft carries right and left hand worms spaced and rigidly fixed to said shaft and meshing with the right and left hand worm wheels 4 and 4'.

Thus constructed and connected, it is manifest that the spur gears 3 and 3' connecting the parallel shafts 1 and 1' have the effect to prevent endwise movement of the worms in their relation to the worm wheels, in either direction, under the pressure of a load on either one or both of the parallel shafts.

The opposed worms being of equal diameter and their threads being equal in number and of equal opposite pitch, each worm receives the back end thrust of the other and exactly counterbalances it by its back end thrust, and each worm receives the back end thrust of the other in aid of its forward thrust, whereby it will be seen that there is not only no necessity of using end thrust bearings, but the power that in the single worm drive is absorbed and expended in such bearings for no other purpose than to prevent endwise movement of the worm on the worm wheel, is utilized as active power to rotate the worm wheels and therewith their shafts in opposite directions.

It will further be seen that each worm, being rigid on the driving shaft, will transmit one half the power of the driving shaft through its respective worm wheel to its respective parallel shaft, and, that the two intermeshing spur gears have the function of uniting the power of the parallel shafts and adapts each parallel shaft as a receiver of the whole power of the driving shaft in either direction and at equal speed, and that either parallel shaft is adapted to be connected to the load and transmit thereto the whole power of the driving shaft.

What I claim is:—

1. An article of manufacture adapted to be utilized as a unit in driving different mechanisms, comprising an inclosing casing, a single driving shaft extending through the casing from end to end, opposed worms carried thereby within the casing, parallel shafts extending laterally through the casing, worm gears thereon meshing with the worms, and meshing spur gears also carried by said shafts within the casing to balance the worm gearing and prevent end thrust, both ends of the driving shaft being adapted for engagement with the source of power and each end of each of the other shafts adapted to be connected to a mechanism to be driven, substantially as described.

2. An article of manufacture adapted to be utilized as a unit to drive different mechanisms, comprising an inclosing casing, a driving shaft extending lengthwise through the upper part of the casing, two shafts extending parallel laterally through the casing at right angles to the first shaft, in a plane below said first shaft, a pair of equal opposed worms fixedly mounted on said first shaft, a pair of opposed worm wheels fixedly mounted, one on each parallel shaft within the casing, and meshing with their respective worms, a pair of meshing spur gears independently and fixedly mounted, one on each parallel shaft, within the casing, both of said parallel shafts having an end portion formed so as to be directly connected to a part to be driven.

In testimony whereof I have hereunto set my hand at Toledo, Ohio, this 20th day of January, 1916, in the presence of two subscribing witnesses.

ANTHONY KUEFER.

In presence of—
FRED A. RIEHM,
BLANCHE O'BRIEN.